United States Patent
Naito

(10) Patent No.: US 11,858,170 B2
(45) Date of Patent: Jan. 2, 2024

(54) METHOD FOR PRODUCING HONEYCOMB STRUCTURE

(71) Applicant: NGK INSULATORS, LTD., Nagoya (JP)

(72) Inventor: Yuto Naito, Hashima-Gun (JP)

(73) Assignee: NGK INSULATORS, LTD., Nagoya (JP)

( * ) Notice: Subject to any disclaimer, the term of this patent is extended or adjusted under 35 U.S.C. 154(b) by 92 days.

(21) Appl. No.: 17/452,792

(22) Filed: Oct. 29, 2021

(65) Prior Publication Data
US 2022/0281135 A1   Sep. 8, 2022

(30) Foreign Application Priority Data
Mar. 8, 2021 (JP) ................. 2021-036626

(51) Int. Cl.
*B28B 3/26* (2006.01)
*B28B 11/00* (2006.01)
*B01J 35/04* (2006.01)

(52) U.S. Cl.
CPC ............... *B28B 3/269* (2013.01); *B01J 35/04* (2013.01); *B28B 11/006* (2013.01)

(58) Field of Classification Search
CPC ....... B28B 3/269; B28B 11/006; B28B 11/12; B01J 35/04; B01D 29/111; B01D 46/2418; Y02A 50/20
See application file for complete search history.

(56) References Cited

U.S. PATENT DOCUMENTS

| 5,852,285 A | 12/1998 | Kato et al. |
| 2009/0246452 A1* | 10/2009 | Ogura ............. B28B 19/00 428/116 |
| 2014/0291315 A1 | 10/2014 | Mase et al. |
| 2015/0260066 A1* | 9/2015 | Hosoi ............. B01D 46/2476 422/174 |

FOREIGN PATENT DOCUMENTS

| JP | H09-103684 A | 4/1997 |
| JP | 6126434 B2 | 5/2017 |

* cited by examiner

*Primary Examiner* — S. Behrooz Ghorishi
(74) *Attorney, Agent, or Firm* — BURR PATENT LAW, PLLC

(57) ABSTRACT

A method for producing a honeycomb structure 1 having a slit 12 includes: a first step of preparing a honeycomb structure 1 being free from slit, and forming the slit 12 leaving at least a part of the outer peripheral wall 10 or the partition wall 11; after the first step, a second step of filling the slit 12 with a joining material 13; and after the second step, a third step of removing at least a part of the outer peripheral wall 10 or the partition wall 11 left in the first step to obtain the honeycomb structure 1 having the slit 12 that divides the honeycomb structure 1.

3 Claims, 2 Drawing Sheets

METHOD FOR PRODUCING HONEYCOMB STRUCTURE

FIELD OF THE INVENTION

The present invention relates to a method for producing a honeycomb structure, which is a catalyst support and also function as a heater by applying a voltage.

BACKGROUND OF THE INVENTION

In general, there is a need to increase an exhaust gas temperature which will be decreased as electrification of a motor vehicle progresses. For example, as disclosed in Patent Literature 1 described below, an electrically heated catalyst (EHC) support that uses a honeycomb structure as a catalyst support and heats the honeycomb structure itself by conducting a current has been proposed.

The honeycomb structure is required to withstand thermal shock caused by the exhaust gas. For example, as disclosed in Patent Literature 2 as described below, the honeycomb structure is provided with a slit(s) to divide an outer peripheral wall, thereby improving the thermal shock resistance of the honeycomb structure. The slit(s) may be provided to divide the honeycomb structure in a cross section orthogonal to an axial direction of the honeycomb structure.

CITATION LIST

Patent Literatures

[Patent Literature 1] Japanese Patent Application Publication No. H09-103684 A
[Patent Literature 2] Japanese Patent No. 6126434 B

SUMMARY OF THE INVENTION

Conventionally, the honeycomb structure having the slit that divides the honeycomb structure, such as that described in Patent Literature 2, has been produced by dividing the honeycomb structure into two parts and bonding them together with a joining material. In this method, the honeycomb structure is once divided into two parts, and they are then bonded together with the joining material, so that the shape may be deteriorated due to joining deviation. The deterioration of the shape due to the joining deviation may cause a decrease in a canning property or a decrease in strength of the honeycomb structure.

The present invention has been made to solve the above problems. One of objects of the present invention is to provide a method for producing a honeycomb structure, which can suppress the joining deviation.

The method for producing a honeycomb structure according to an embodiment of the present invention is a method for producing a ceramic honeycomb structure, the honeycomb structure comprising: an outer peripheral wall; a partition wall arranged on an inner side of the outer peripheral wall, the partition wall defining a plurality of cells each extending from one end face to other end face to form a flow path, the honeycomb structure having a slit that divides the honeycomb structure in a cross section orthogonal to an axial direction of the honeycomb structure, wherein the method comprises: a first step of preparing a honeycomb structure being free from slit, and forming the slit leaving at least a part of the outer peripheral wall or the partition wall; a second step of filling, after the first step, the slit with a joining material; and a third step of removing, after the second step, at least a part of the outer peripheral wall or the partition wall left in the first step to obtain the honeycomb structure having the slit that divides the honeycomb structure.

According to the method for producing the honeycomb structure, joining deviation can be suppressed, because the slit is formed leaving at least a part of the outer peripheral wall or the partition wall, the slit is filled with a joining material, and at least a part of the outer peripheral wall or the partition wall left is then removed.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Figure 1:
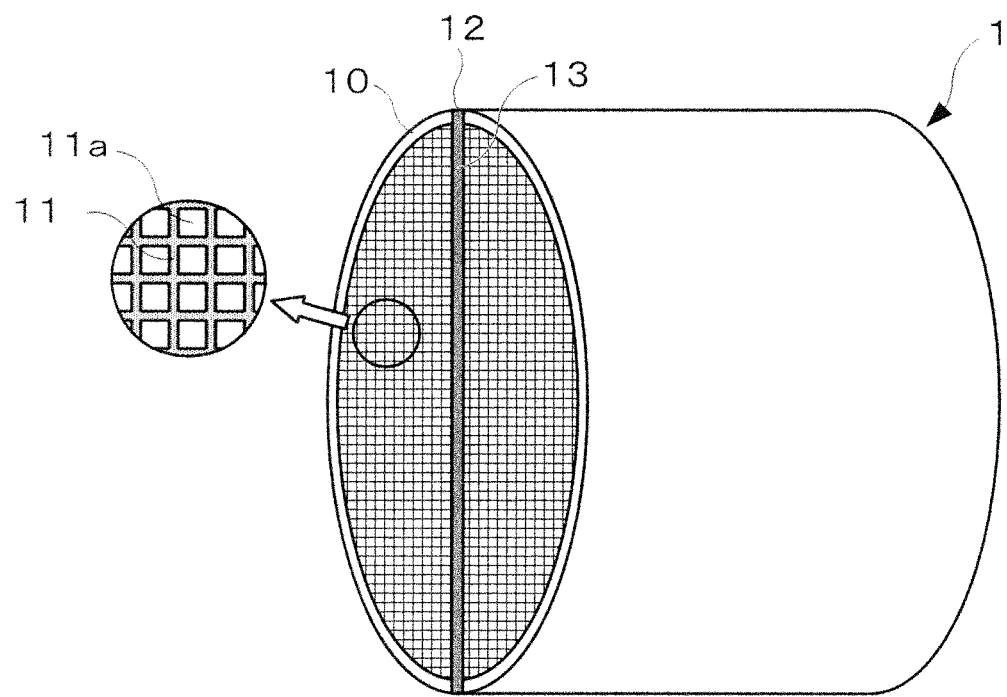
FIG. 1 is a perspective view showing a honeycomb structure produced by a method for producing a honeycomb structure according to an embodiment of the present invention.

FIG. 1 is a perspective view showing a honeycomb structure 1 produced by a method for producing the honeycomb structure 1 according to an embodiment of the present invention. The honeycomb structure 1 shown in FIG. 1 is a pillar shaped member made of ceramics, and includes: an outer peripheral wall 10; and a partition wall 11 which is arranged on an inner side of the peripheral wall 10 and define a plurality of cells 11a each extending from one end face to other end face to form a flow path. The pillar shape is understood as a three-dimensional shape having a thickness in an extending direction of the cells 11a (axial direction of the honeycomb structure 1). A ratio of an axial length of the honeycomb structure 1 to a diameter or width of the end face of the honeycomb structure 1 (aspect ratio) is arbitrary. The pillar shape may also include a shape in which the axial length of the honeycomb structure 1 is shorter than the diameter or width of the end face (flat shape).

An outer shape of the honeycomb structure 1 is not particularly limited as long as it has a pillar shape. For example, it can be other shapes such as a pillar shape having circular end faces (cylindrical shape), a pillar shape having oval end faces, and a pillar shape having polygonal (rectangular, pentagonal, hexagonal, heptagonal, octagonal, etc.) end faces. As for the size of the honeycomb structure 1, an area of the end faces is preferably from 2,000 to 20,000 $mm^2$, and even more preferably from 5,000 to 15,000 $mm^2$, in order to increase heat resistance (to suppress cracks generated in the circumferential direction of the outer peripheral wall).

A shape of each cell in the cross section perpendicular to the extending direction of the cells 11a may preferably be a quadrangle, hexagon, octagon, or a combination thereof.

Among these, the quadrangle and the hexagon are preferred. Such a cell shape can lead to a decreased pressure loss when an exhaust gas flows through the honeycomb structure 1, which can provide improved purification performance. The quadrangle is particularly preferred from the viewpoint that it is easy to achieve both structural strength and heating uniformity.

Each of the partition wall 11 that define the cells 11a preferably has a thickness of from 0.1 to 0.3 mm, and more preferably from 0.15 to 0.25 mm. The thickness of 0.1 mm or more of each partition wall 11 can suppress a decrease in the strength of the honeycomb structure 1. The thickness of each partition wall 11 of 0.3 mm or less can suppress a larger pressure loss when an exhaust gas flows through the honeycomb structure 1 if the honeycomb structure 1 is used as a catalyst support to support a catalyst. In the present invention, the thickness of each partition wall 11 is defined as a length of a portion passing through the partition wall 11, among line segments connecting the centers of gravity of adjacent cells 11a, in the cross section perpendicular to the extending direction of the cells 11a.

The honeycomb structure 1 preferably has a cell density of from 40 to 150 cells/cm$^2$, and more preferably from 70 to 100 cells/cm$^2$, in the cross section perpendicular to the flow path direction of the cells 11a. The cell density in such a range can allow the purification performance of the catalyst to be increased while reducing the pressure loss when the exhaust gas flows. The cell density of 40 cells/cm$^2$ or more can allow a catalyst supported area to be sufficiently ensured. The cell density of 150 cells/cm$^2$ or less can prevent the pressure loss when the exhaust gas flows through the honeycomb structure 1 from being increased if the honeycomb structure 1 is used as a catalyst support to support the catalyst. The cell density is a value obtained by dividing the number of cells by the area of one end face portion of the honeycomb structure 1 excluding the outer peripheral wall 10 portion.

The provision of the outer peripheral wall 10 of the honeycomb structure 1 is useful from the viewpoints of ensuring the structural strength of the honeycomb structure 1 and suppressing the leakage of a fluid flowing through the cells 11a from the outer perimeter wall 10. Specifically, the thickness of the outer peripheral wall 10 is preferably 0.05 mm or more, and more preferably 0.10 mm or more, and even more preferably 0.15 mm or more. However, if the outer peripheral wall 10 is too thick, the strength will be too high, and a strength balance between the outer peripheral wall 10 and the partition wall 11 will be lost, resulting in a decrease in thermal shock resistance. Therefore, the thickness of the outer peripheral wall 10 is preferably 1.0 mm or less, and more preferably 0.7 mm or less, and even more preferably 0.5 mm or less. The thickness of the outer peripheral wall 10 is defined as a thickness of the outer peripheral wall in the normal line direction relative to the tangent line at a measured point when the point of the outer peripheral wall 10 where the thickness is to be measured is observed in the cross section perpendicular to the extending direction of the cells.

The honeycomb structure 1 is made of ceramics and is preferably electrically conductive. Electric resistivity is not particularly limited as long as the honeycomb structure 1 is capable of heat generation by Joule heat when a current is applied. Preferably, the electric resistivity is from 0.1 to 200 Ωcm, and more preferably from 1 to 200 Ωcm. As used herein, the electric resistivity of the honeycomb structure 1 refers to a value measured at 25° C. by the four-terminal method.

The honeycomb structure 1 can be made of a material selected from the group consisting of oxide ceramics such as alumina, mullite, zirconia and cordierite, and non-oxide ceramics such as silicon carbide, silicon nitride and aluminum nitride, although not limited thereto. Further, silicon carbide-metal-silicon composite materials and silicon carbide/graphite composite materials can also be used. Among these, it is preferable that the material of the honeycomb structure 1 contains ceramics mainly based on a silicon-silicon carbide composite material or silicon carbide, in terms of balancing heat resistance and electrical conductivity. The phrase "the material of the honeycomb structure 1 is mainly based on silicon-silicon carbide composite material" means that the honeycomb structure 1 contains 90% by mass of more of silicon-silicon carbide composite material (total mass) based on the total material. Here, the silicon-silicon carbide composite material contains silicon carbide particles as an aggregate and silicon as a binding material to bind the silicon carbide particles, preferably in which a plurality of silicon carbide particles are bound by silicon such that pores are formed between the silicon carbide particles. The phrase "the material of the honeycomb structure 1 is mainly based on silicon carbide" means that the honeycomb structure 1 contains 90% or more of silicon carbide (total mass) based on the total material.

When the honeycomb structure 1 contains the silicon-silicon carbide composite material, a ratio of the "mass of silicon as a binding material" contained in the honeycomb structure 1 to the total of the "mass of silicon carbide particles as an aggregate" contained in the honeycomb structure 1 and the "mass of silicon as a binding material" contained in the honeycomb structure 1 is preferably from 10 to 40% by mass, and more preferably from 15 to 35% by mass.

The partition wall 11 may be porous. When the partition wall 11 is porous, the porosity of the partition walls 11 is preferably from 35 to 60%, and even more preferably from 35 to 45%. The porosity is a value measured by a mercury porosimeter.

The partition wall 11 of the honeycomb structure 1 preferably has an average pore diameter of from 2 to 15 μm, and even more preferably from 4 to 8 μm. The average pore diameter is a value measured by a mercury porosimeter.

The honeycomb structure 1 has a slit 12 that divides the honeycomb structure 1 in a cross section orthogonal to an axial direction of the honeycomb structure 1. The slit 12 extends in a straight line from one end to the other end of the honeycomb structure 1 in the radial or width direction of the honeycomb structure 1. The slit 12 also extends in a straight line from one end face to the other end face of the honeycomb structure 1 in the axial direction of the honeycomb structure 1.

The slit 12 is filled with a joining material 13. The joining material 13 is filled in at least a part of a space of the slit 12. The joining material 13 is preferably filled in 50% or more of the space of the slit 12, and the joining material 13 is more preferably filled in the entire space of the slit 12. In the embodiment as shown in FIG. 1, the joining material 13 is filled in the entire space of the slit 12 to form a plane integrated with both end faces of the honeycomb structure 1 and a curved surface integrated with the outer peripheral wall 10 of the honeycomb structure 1. However, the joining material 13 may be filled to a position on an axially inner side than the end faces of the honeycomb structure 1, or may be filled to a position on an inner side in the radial or width direction than the outer peripheral wall 10 of the honeycomb structure 1.

When the main component of the honeycomb structure 1 is silicon carbide or the metal silicon-silicon carbide composite material, the joining material 13 preferably contains at least 20% by mass silicon carbide, and more preferable from 20 to 70% by mass of silicon carbide. This can allow a thermal expansion coefficient of the joining material 13 to be close to that of the honeycomb structure 1, thereby improving the thermal shock resistance of the honeycomb structure 1. The joining material 13 may contain 30% by mass or more of silica, alumina, or the like.

Although not shown, a pair of electrode layers each extending in the form of band in the flow path direction of the cells 11a may be provided on the outer surface of the outer peripheral wall 10 of the honeycomb structure 1, and electrode terminals may be provided on these electrode layers. A voltage can be applied to the honeycomb structure 1 through those electrode terminals and electrode layers to generate heat in the honeycomb structure 1.

The electric resistivity of the electrode layers is preferably $1/200$ or more and $1/10$ or less of that of the honeycomb structure 1, in terms of facilitating the flow of electricity to the electrode layers.

Each electrode layer may be made of conductive ceramics, a metal, or a composite material (cermet) of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicides such as tantalum silicide ($TaSi_2$) and chromium silicide ($CrSi_2$).

As a method for producing the honeycomb structure 1 having the electrode layers, first, an electrode layer forming raw material containing ceramic materials is applied onto a side surface of a honeycomb dried body and dried to form a pair of unfired electrode layers on the outer surface of the outer peripheral wall so as to extend in the form of band in the flow path direction of the cells, across the central axis of the honeycomb dried body, thereby providing a honeycomb dried body with unfired electrode layers. Then, the honeycomb dried body with unfired electrode layers is fired to produce a honeycomb fired body having a pair of electrode layers. The honeycomb structure 1 having the electrode layers is thus obtained.

Figure 2:
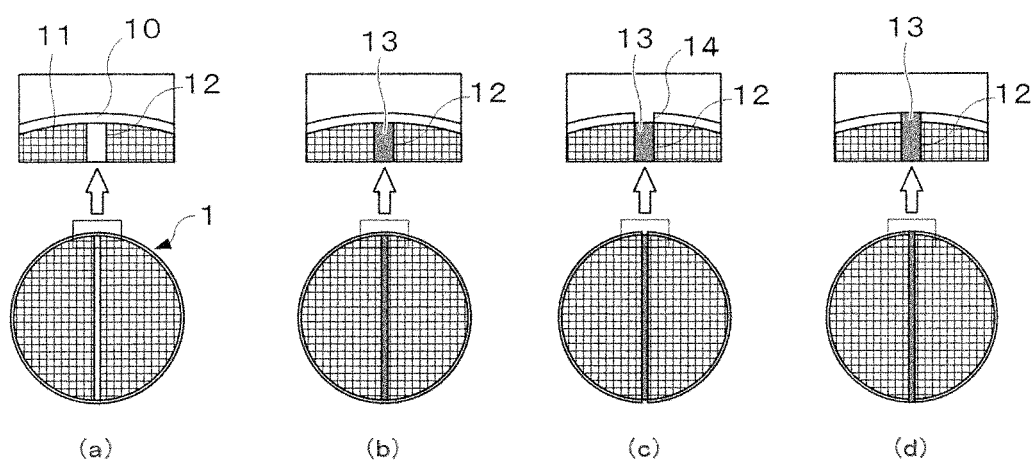
FIG. 2 is an explanatory view showing a method for producing a honeycomb structure, for producing the honeycomb structure in FIG. 1.

Next, FIG. 2 is an explanatory view showing a method for producing the honeycomb structure 1. The honeycomb structure 1 in FIG. 1 can be produced through a first step shown in (a), a second step shown in (b), a third step shown in (c), and a fourth step shown in (d) of FIG. 2.

As shown in FIG. 2(*a*), in the first step, the honeycomb structure 1 being free from slit is prepared, and the slit 12 is formed leaving at least a part of the outer peripheral wall 10 or the partition wall 11. The slit 12 can be formed, for example, by cutting the outer peripheral wall 10 or the partition wall 11. In this case, it is preferable to leave at least a part of the peripheral wall 10 or the partition wall 11 such that both sides of the honeycomb structure 1 across the slit 12 are connected by the peripheral wall 10 or the partition wall 11. In other words, it is preferable that at least a part of the outer peripheral wall 10 or the partition wall 11 is left on both sides of the slit 12 in the radial or width direction or the axial direction. This is to prevent the honeycomb structure 1 from collapsing after the slit 12 is formed in the first step. As shown in FIG. 2(*a*), it is more preferable to leave at least a part of the outer peripheral wall 10. More particularly, it is more preferable to leave all of the outer peripheral wall 10 at a position where the slit 12 is formed (leave the outer peripheral wall 10 over the entire region in the axial direction at the positions on both sides of the honeycomb structure 1 in the radial or width direction). This is to prevent the honeycomb structure 1 from collapsing after the first step by leaving the entire outer peripheral wall 10 which has relatively high strength. Also, as shown in FIG. 2(*a*), it is preferable to remove all of the partition wall 11 at the position where the slit 12 is formed. This is to reduce the workload of the subsequent third step. However, in contrast to the embodiment shown in FIG. 2(*a*), the partition wall 11 may be left in place of the outer peripheral wall 10. When leaving a part of the partition wall 11, all of the peripheral wall 10 at the position where the slit 12 is formed may be removed, or at least a part of the peripheral wall 10 at the same position may be further left. The position where a part of the outer peripheral wall 10 or the partition wall 11 is left may be only a part in the radial or width direction, or only a part in the axial direction.

The second step shown in (b) of FIG. 2 is carried out after the first step. In the second step, the slit 12 formed in the first step is filled with the joining material 13. The joining material 13 can be filled in the slit 12 by press-fitting using a jig such as a syringe, for example.

The third step shown in (c) of FIG. 2 is carried out after the second step. In the third step, at least a part of the outer peripheral wall 10 or the partition wall 11 left in the first step is removed to obtain the honeycomb structure 1 having the slit 12 that divides the honeycomb structure 1. FIG. 2(*c*) shows a mode where the outer peripheral wall 10 left in the first step is removed to form a groove 14 extending in the axial direction of the honeycomb structure 1. The portions of the honeycomb structure 1 that are divided by the slit 12 are joined by the outer peripheral wall 10, a part of the partition wall 11, or the joining material 13 throughout the first to third steps. This can suppress the joining deviation as compared to the case where at least a part of the outer peripheral wall 10 or the partition wall 11 is not left in the first step.

The third step is preferably carried out after the joining material 13 filled in the second step has been dried and solidified. The joining material 13 may be dried by leaving the honeycomb structure 1 as it is for a predetermined time after filling the slit 12 with the joining material 13, or by using a drying furnace or other equipment, for example.

The fourth step shown in (d) of FIG. 2 is carried out after the third step. In the fourth step, the portion where at least a part of the outer peripheral wall 10 or the partition wall 11 has been removed in the third step is filled with the joining material 13. FIG. 2(*d*) shows a mode where the joining material 13 is filled in the groove 14 extending in the axial direction of the honeycomb structure 1 so as to form a curved surface integrated with the outer peripheral wall 10 of the honeycomb structure 1. The fourth step is not essential, and the production of the honeycomb structure 1 may be completed in the third step.

In the method for producing the honeycomb structure 1 according the present embodiment, the joining deviation can be suppressed, because at least a part of the outer peripheral wall 10 or the partition wall 11 is left to form the slit 12, and the slit 12 is filled with the joining material 13, and at least a part of the outer peripheral wall 10 or the partition wall 11 left is then removed. This can allow deterioration of the shape of the honeycomb structure 1 to be suppressed, thereby avoiding a decrease in the canning property or a decrease in the strength of the honeycomb structure 1.

In the first step, the joining deviation can be more reliably suppressed because at least a part of the outer peripheral wall 10 is left.

After the third step, the portion where at least a part of the outer peripheral wall 10 or the partition wall 11 has been removed is filled with the joining material 13, so that the entire slit 12 can be filled with the joining material 13, thereby improving the strength of the honeycomb structure 1.

DESCRIPTION OF REFERENCE NUMERALS

1: honeycomb structure
10: outer peripheral wall
11: partition wall
11*a*: cell
12: slit
13: joining material

The invention claimed is:

1. A method for producing a ceramic honeycomb structure, the honeycomb structure comprising: an outer peripheral wall; a partition wall arranged on an inner side of the outer peripheral wall, the partition wall defining a plurality of cells each extending from one end face to other end face to form a flow path, the honeycomb structure having a slit that divides the honeycomb structure in a cross section orthogonal to an axial direction of the honeycomb structure, wherein the method comprises:
   a first step of preparing a honeycomb structure being free from slit, and forming the slit leaving at least a part of the outer peripheral wall;
   a second step of filling, after the first step, the slit with a joining material; and
   a third step of removing, after the second step, at least a part of the outer peripheral wall left in a linear direction of the slit formed in the first step to obtain the honeycomb structure having the slit that divides the honeycomb structure.

2. The method for producing a honeycomb structure according to claim 1, further comprising, after the third step, a fourth step of filling the joining material in a portion where at least a part of the outer peripheral wall has been removed.

3. The method for producing a honeycomb structure according to claim 1, wherein the honeycomb structure has a pair of electrode layers provided on an outer surface of the outer peripheral wall.

\* \* \* \* \*